United States Patent [19]

Kast

[11] 4,000,135
[45] Dec. 28, 1976

[54] MANUFACTURE OF BASIC DYES BY CATALYTIC OXIDATION

[75] Inventor: Hellmut Kast, Bobenheim-Roxheim, Germany

[73] Assignee: BASF Aktiengesellschaft, Ludwigshafen (Rhine), Germany

[22] Filed: July 8, 1974

[21] Appl. No.: 486,677

[30] Foreign Application Priority Data

July 10, 1973 Germany .......................... 2334918
June 7, 1974 Germany .......................... 2427606

[52] U.S. Cl. ..................... 260/246 B; 260/268 R;
260/293.51; 260/293.54; 260/309; 260/310
A; 260/310 R; 260/326.15; 260/326.8;
260/393; 260/465 E; 260/465 H; 260/471 C;
260/510; 260/570 D
[51] Int. Cl.$^2$ ............... C07C 87/50; C07C 87/62
[58] Field of Search ........ 260/570 D, 570 AB, 393,
260/687, 310 R, 310 A, 326.15, 510, 465 E,
465 H, 47 C, 246 B, 268 R, 293.51, 326.8,
309, 293.54

[56] References Cited

UNITED STATES PATENTS 3,828,071   8/1974   Kast et al. ................. 260/326.15

OTHER PUBLICATIONS

Ritchie et al., J. Am. Chem. Soc., 84, 2349–2356, (1962).
Lewis et al., J. Am. Chem. Soc. 92, 899–905, (1970).
Pajakoff, Chem. Abstracts 59, 6983c, (1963).
Glavind, Chem. Abstracts 46, 8485a, (1952).

*Primary Examiner*—D. Horwitz
*Attorney, Agent, or Firm*—Johnston, Keil, Thompson & Shurtleff

[57] ABSTRACT

A catalytic process for the oxidation of compounds of the formula

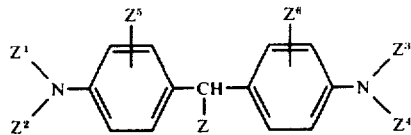

where Z to $Z^6$ are hydrogen or substituents, in which iron tetraazaannulenes are used as catalysts. The process gives good yields when using oxygen for oxidation.

3 Claims, No Drawings

MANUFACTURE OF BASIC DYES BY CATALYTIC OXIDATION

U.S. Pat. No. 3,828,071 is concerned with a process for the catalytic oxidation of compounds of the formula (a)

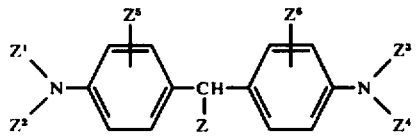

in which $Z^1$, $Z^2$, $Z^3$ and $Z^4$ independently of one another are hydrogen, unsubstituted or substituted alkyl, cycloalkyl, aralkyl or aryl, $Z^1$ and $Z^2$, or $Z^3$ and $Z^4$, together with the nitrogen, are a heterocyclic structure, $Z^5$ is hydrogen, halogen, alkyl or alkoxy, $Z^6$ is hydrogen, halogen, alkyl or alkoxy and Z is hydrogen, unsubstituted or substituted aryl or a heterocyclic radical, wherein compounds of the formula (a) are treated with fluorine-, chlorine-, bromine- or nitrile-substituted benzoquinones or with nitro-substituted phenanthrenequinones in the presence of oxygen and of catalysts, which contain heavy metal bound as a complex and which activate oxygen.

The process described in U.S. Pat. No. 3,828,071 is suitable for the production of p-amino-substituted diarylketones and basic dyes by said catalytic oxidation of the compounds (a). Such products and the initial compounds (a) are fully illustrated in said U.S. patent which is incorporated herein by reference as fully as if set forth in its entirety.

We have now found that the process described in the said U.S. patent can be performed particularly advantageously if the catalysts, which contain heavy metal bound as a complex and which activate oxygen, which are used, are compounds of the formula I

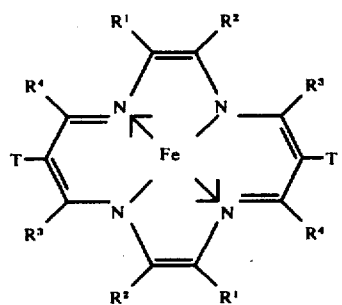

in which $R^1$ to $R^4$ independently of one another are hydrogen or methyl, $R^3$ or $R^4$ can also be phenyl and $R^1$ and $R^2$ together with the carbon atoms by which they are linked can also be a carbocyclic or heterocyclic radical, T is hydrogen or D—N=N— and D is the radical of a diazo component.

The carbocyclic radicals formed from $R^1$ and $R^2$ together with the carbon atoms by which they are linked preferably correspond to the formula

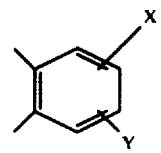

in which X is hydrogen, chlorine, bromine, methyl, ethyl, phenyl, methoxy, nitro, nitrile, methylsulfonyl or carboalkoxy of 2 to 5 carbon atoms in total, Y is hydrogen, chlorine or methyl and X and Y together are a fused benz-ring, tetramethylene or o-phthaloyl.

Suitable heterocyclic radicals are derived, for example, from diaminopyridines, diaminoquinoxalines or diaminobenzimidazoles.

The radicals D of te diazo components in the main belong to the benzene, benzthiazole, benzisothiazole, thiazole, thiadiazole, thiophene, triazole, indazole or pyrazole series.

Radicals D derived from anilines and benzthiazoles are preferred.

Examples of substituents of the radicals D of the aniline series are fluorine, chlorine, bromine, nitro, nitrile, methylsulfonyl, ethylsulfonyl, phenylazo, carboalkoxy of 2 to 5 carbon atoms, trifluoromethyl, methyl, ethyl, methoxy, ethoxy or acetylamino.

Examples of diazo components of the heterocyclic series are 2-aminobenzthiazole, 2-amino-5-methoxybenzthiazole, 2-aminothiazole, 3-aminotriazole, 3-amino-5-phenyltriazole, 3-aminoindazole and 1-phenyl-3-aminopyrazole.

The manufacture of the compounds with T=H is described in U.S. Application Ser. No. 384,628 (now abandoned) which is incorporated herein by reference.

The compounds of the formule I with T = D—N=N— can be manufactured by reacting compounds of the formula II

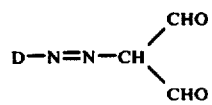

with diamines of the formula III

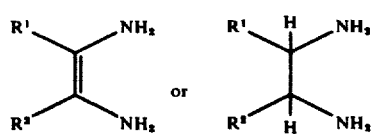

in the presence of a compound which acts as an iron donor.

The compounds of the formula II can be manufactured by, for example, the following method:

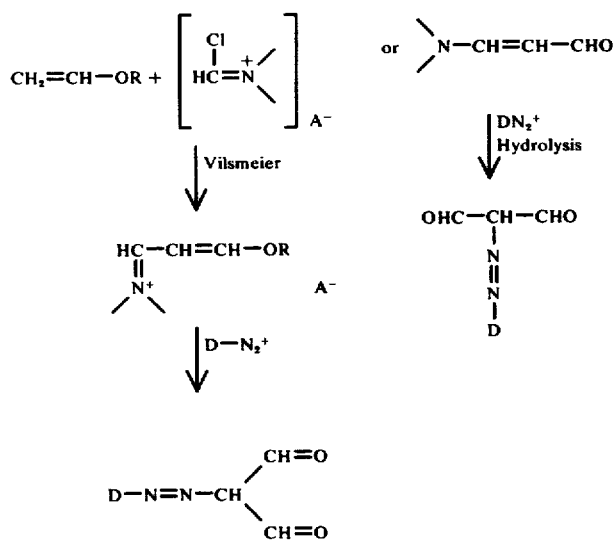

In these formulae, A⁻ is an anion and R is, for example, alkyl of 1 to 4 carbon atoms.

The reactions are known in principle and are carried out analogously. Details are disclosed in the examples.

Examples of diamines of the formula III are: ethylenediamine, propylenediamine, 1,2-cyclohexylenediamine, 1,2-phenylenediamine, 4-chloro-1,2-phenylenediamine, 4-methyl-1,2-phenylenediamine, 4,5-dimethyl-1,2-phenylenediamine, 4,5-dichloro-1,2-phenylenediamine, 4-methoxy-1,2-phenylenediamine, 4-methylsulfonyl-1,2-phenylenediamine, 4-methoxycarbonyl-1,2-phenylenediamine, 4-nitro-1,2-phenylenediamine, 4-cyano-1,2-phenylenediamine, 4-acetylamino-1,2-phenylenediamine, 1,2-diamino-5,6,7,8-tetrahydronaphthalene, 1,2-diaminonaphthalene, 2,3-diaminonapthalene, 2,3-diaminoanthraquinone, 2,3-diaminoquinoxaline, 2-methyl-5,6-diaminobenzimidazole, 5,6-diaminobenzimidazole and 3,4-diaminopyridine.

Examples of compounds which act as iron donors are iron salts of weak inorganic or organic acids, such as basic Fe-III acetate, Fe-II acetate, Fe-III propionate, Fe-II formate, Fe-III formate, Fe-II glycollate, Fe-III lactate, Fe-III malate, Fe-III oxalate, Fe-II oxalate, Fe-III malonate, Fe-III succinate, Fe-III tartrate and Fe-III citrate, and also Fe-II and Fe-III hydroxides. Examples of preferred iron compounds are the acetates and the hydroxides.

The reaction of the compounds of the formula II with the diamines of the formula III is suitably carried out by adding the compound of the formula II, preferably as a solution, to a solution or suspension of the diamine and the compound which acts as an iron donor in, for example, alcohols, glycols, glycol ethers or amides conventionally employed as solvents, at elevated temperature.

Individual examples of solvents for the reaction are methanol, ethanol, i-butanol, glycol, ethylene glycol monomethyl ether, monoethyl ether or monobutyl ether, dimethylformamide, dimethylacetamide and N-methylpyrrolidone.

A suitable temperature for the reactions is from about 20° to 150° C, preferably from 30° to 110° C.

After completion of the reaction, the sparingly soluble iron complexes are isolated from the reaction mixture by filtration and can be purified by washing with solvents and dilute aqueous mineral acids, or extraction with boiling solvents.

The sparingly soluble red-brown to black iron complexes are, as a rule, not analytically pure and contain up to 20% of added-on oxygen. Nevertheless, their catalytic activity is excellent.

For use as catalysts, the new metal complexes can in addition be subjected to treatments in which comminution, dispersion or recrystallization processes occur. Depending on the end use, the iron complexes can be employed in the pure form or as formulations on or in a great variety of carriers, for example active charcoal, carbon black, kieselguhr, silica gel or aluminum oxide.

The compounds of the formula I are excellent oxidation catalysts which are particularly active and give a high space-time yield when used in the process of the U.S. Pat. No. 3,828,071.

Compounds of the formula Ia

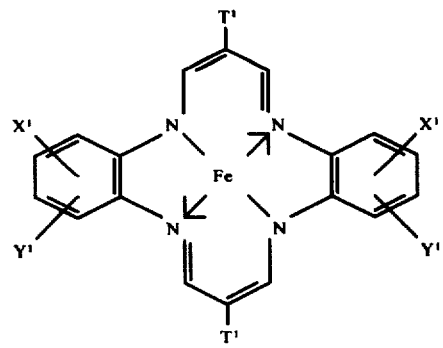

in which $X^1$ and $Y^1$ independently of one another are hydrogen, methyl, chlorine or bromine, $T^1$ is hydrogen or $D^1$—N=N— and $D^1$ is phenyl, o-tolyl, p-tolyl, o-anisyl, p-anisyl, p-ethoxyphenyl, p-chlorophenyl, o-chlorophenyl or 2,4-dichlorophenyl are of particular industrial importance.

The use of the compound wherein $T^1 = H$ is particularly preferred.

Details of how to perform the catalytic process, and further data, are to be found in the U.S. Pat. No.

3,828,071. The process of the present invention may be performed in a similar manner.

EXAMPLE 1

A mixture of 1,089 parts of dimethylaniline, 90 parts of paraformaldehyde and 1,391 parts of glacial acetic acid is heated to 70° C for 1 hour. The reaction solution is then cooled to 50° C, 15 parts of chloranil and 15 parts of the compound of the formula

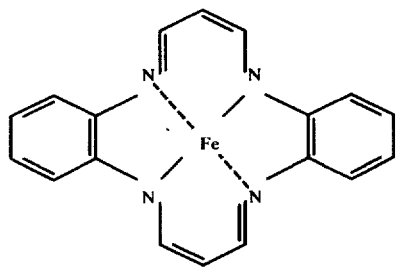

are added and the mixture is gassed with air for 20 hours, whilst stirring vigorously. About 800 parts of glacial acetic acid are then distilled off under reduced pressure, the residue is dissolved in 16,000 parts of water at 95° C, the solution is filtered hot and the dye is precipitated from the filtrate, at pH < 1.5, by means of 3,000 parts of sodium chloride. The crystalline dye is filtered off and washed with 3,000 parts of dilute NaCl solution.

Yield: 1,050 parts.

EXAMPLE 2

A mixture of 822 parts of dimethylaniline, 235 parts of monomethylaniline, 90 parts of paraformaldehyde and 1,322 parts of propionic acid is heated to 70° C for one hour. After cooling to 50° C, 15 parts of chloranil and 15 parts of the compound of the formula

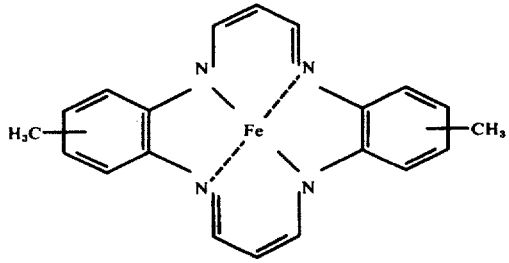

are added and the mixture is gassed with air for 18 hours, whilst stirring vigorously. About 800 parts of propionic acid are then distilled off under reduced pressure, the residue is dissolved in 16,000 parts of water at 95° C, the solution is filtered hot and the dye is precipitated from the filtrate by means of 3,000 parts of sodium chloride. The dye resin is isolated by decanting the aqueous phase.

Yield: 1,037 parts.

EXAMPLE 3

A mixture of 987 parts of leuco-Malachite Green, 1,483 parts of glacial acetic acid, 15 parts of chloranil and 15 parts of the compound of the formula

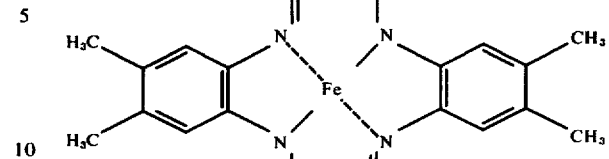

is gassed with air for 15 hours at 50° C, whilst stirring vigorously. After the oxidation, about 800 parts of glacial acetic acid are distilled off under reduced pressure, the residue is dissolved in 15,000 parts of water at 95° C and the solution is filtered hot. After adding 12,000 parts of xylene to the filtrate, the dye base is liberated by means of 50% strength sodium hydroxide solution (pH = 10.5); the base dissolves in the xylene. The xylene phase is separated off and the dye chloride is precipitated by passing in 200 parts of hydrogen chloride. After drying at 60° C, 1,080 parts of dye are obtained.

EXAMPLE 4 a mixture of 1,343 parts of diethyaniline, 90 parts of paraformaldehyde and 1,137 parts of glacial acetic acid is heated to 70° C for 1 hour. The solution is cooled to 50° C, 15 parts of chloroanil and 25 parts of the compound of the formula

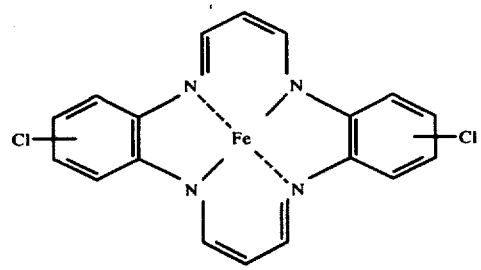

are then added and the mixture is gassed with air for 20 hours, whilst stirring vigorously. About 600 parts of glacial acetic acid are then distilled off under reduced pressure, the residue is dissolved in 14,000 parts of water at 95° C, the solution is filtered hot and the dye is precipitated from the filtrate at pH = 2.0, by means of 3,000 parts of sodium chloride.

Yield: 1,251 parts.

If, in Example 1, the metal complex is replaced by the compounds characterized in the table, the dye is obtained in the yields shown below:

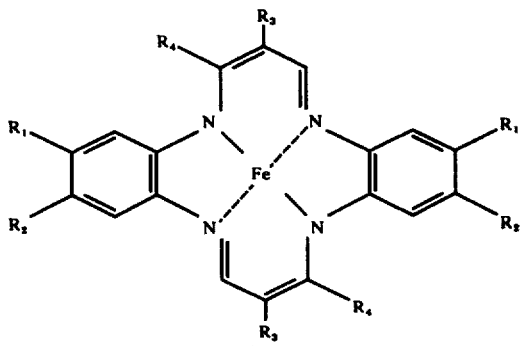

| Example | R₁  | R₂  | R₃  | R₄  | Yield (parts) |
|---------|-----|-----|-----|-----|---------------|
| 5       | CH₃ | H   | H   | H   | .071          |
| 6       | CH₃ | CH₃ | H   | H   | 1,094         |
| 7       | Cl  | H   | H   | H   | 950           |
| 8       | CH₃ | CH₃ | CH₃ | H   | 842           |
| 9       | CH₃ | CH₃ | H   | CH₃ | 638           |

EXAMPLE 10

352 g of phenylazomalondialdehyde are introduced into a mixture of 216 g of o-phenylenediamine, 220 g of iron-III acetate and 2,500 ml of isobutanol at 70° C, and the mixture is then stirred for 4 hours at the reflux temperature, whereupon a black precipitate forms after merely a few minutes. The reaction mixture is then filtered hot and the residue is washed successively with isobutanol, about 3% strength sulfuric acid and acetone. This gives 412 g of a black-brown compound of the formula

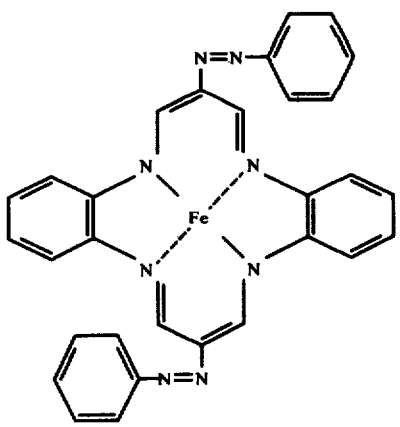

which exhibits excellent catalytic activity.

A mixture of 1,089 g of dimethylaniline, 90 g of paraformaldehyde and 1,391 parts (sic) of glacial acetic acid is heated to 70° C for 1 hour. The solution is then cooled to 50° C, 15 g of chloranil and 15 g of the compound prepared as above, of te formula

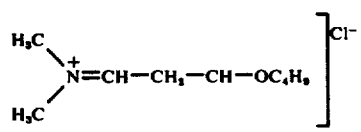

are then added, and the mixture is gassed with air for 15 hours, whilst stirring vigorously. About 800 g of glacial acetic acid are then distilled off under reduced pressure, the residue is dissolved in 16 l of water, the solution is filtered hot and the dye is precipitated from the filtrate, at pH = 1.5, by means of 3,000 g of sodium chloride. The crystalline dye is filtered off and washed with 3,000 ml of dilute NaCl solution (5% strength).

Yield: 1,080 parts of Crystal Violet.

The phenylazomalondialdehyde used to prepare the complex is obtained as follows:

A mixture of 150 kg of vinyl isobutyl ether and 110 kg of dimethylformamide is introduced continuously into a circulation apparatus at 75° to 85° C, with simultaneous introduction of 165 kg of phosgene gas; reaction solution is removed at the feed rate and is heated in an after - reactor at 80° C for one hour. The product thus obtained, of the formula $$\left[\begin{array}{c}H_3C\\ \phantom{x}\diagdown\\ \phantom{xx}\overset{+}{N}=CH-CH_2-CH-OC_4H_9\\ \phantom{x}\diagup\\ H_3C\end{array}\right]Cl^-$$

is used direct, without additional purification, as the coupling component.

Yield: 377 kg.

A diazonium solution prepared from 93 g of aniline in dilute hydrochloric acid is added dropwise to a filtered solution of 253 kg of the formylation product prepared as described, at 0° to 5° C. At the same time, the pH value of the coupling mixture is adjusted to from 4.3 to 4.8 by an aqueous sodium acetate solution of about 30% strength. The mixture is stirred overnight at room temperature and the resulting precipitate is then filtered off and washed with water. After drying, 131 g of the compound of the formula

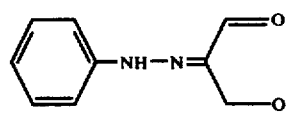

are obtained. After recrystallization from ethanol, the compound melts at from 114 to 116° C.

The diamines and dialdehydes listed in the table which follows give, analogously to Example 10, the corresponding iron complexes 2 to 36:

| | Diamine (formula III) | Arylazomalondialdehyde (formula II) | Solvent |
|---|---|---|---|
| 2 | 4-chloro-1,2-phenylenediamine | phenylazo- | isobutanol |
| 3 | 4-methyl-1,2-phenylenediamine | ″ | ″ |
| 4 | 4-nitro-1,2-phenylenediamine | ″ | ″ |
| 5 | 4,5-dimethyl-1,2-phenylenediamine | ″ | ″ |
| 6 | 4,5-dichloro-1,2-phenylenediamine | ″ | ″ |
| 7 | 4-cyano-1,2-phenylenediamine | ″ | ″ |
| 8 | ethylenediamine | ″ | ″ |
| 9 | 4-methoxy-1,2-phenylenediamine | ″ | dimethylformamide |
| 10 | 4-methylsulfonyl-1,2-phenylenediamine | ″ | ″ |
| 11 | 2,3-diaminonaphthalene | ″ | isobutanol |
| 12 | 2,3-diamino-5,6,7,8-tetrahydronaphthalene | ″ | ″ |
| 13 | 2,3-diaminoquinoxaline | ″ | dimethylformamide |
| 14 | 2-methyl-5,6-diaminobenzimidazole | ″ | ″ |
| 15 | 1,2-phenylenediamine | p-chlorophenylazo- | methyl glycol |
| 16 | ″ | p-methoxyphenylazo- | isobutanol |
| 17 | ″ | p-methylphenylazo- | ″ |
| 18 | ″ | p-ethoxyphenylazo- | ″ |
| 19 | ″ | p-bromophenylazo- | ″ |
| 20 | ″ | p-nitrophenylazo- | dimethylformamide |
| 21 | ″ | p-cyanophenylazo- | isobutanol |
| 22 | ″ | p-methylsulfonylphenylazo- | N-methylpyrrolidone |
| 23 | ″ | p-ethylphenylazo- | isobutanol |
| 24 | ″ | p-acetylphenylazo- | ″ |
| 25 | ″ | p-fluorophenylazo- | ″ |
| 26 | ″ | 2,4-bis(methoxy)phenylazo- | ″ |
| 27 | ″ | 2,4-dichlorophenylazo- | ″ |
| 28 | ″ | 3-acetylaminophenylazo- | 41 |
| 29 | ″ | benzthiazole-2-azo- | ″ |
| 30 | ″ | thiazole-2-azo- | ″ |
| 31 | ″ | 1,2,4-triazole-3-azo- | ″ |
| 32 | 4-methyl-1,2-phenylenediamine | p-chlorophenylazo- | ″ |
| 33 | ″ | p-tolylazo- | methanol |
| 34 | ″ | p-methoxyphenylazo- | ethanol |
| 35 | 4-chloro-1,2-phenylenediamine | p-methoxyphenylazo- | isobutanol |
| 36 | 2,3-diaminoquinoxaline | ″ | ″ |

In Example 10, Fe-III acetate can be replaced by the following iron donors: Fe-III propionate, Fe-III formate, Fe-II glycollate, Fe-III lactate, Fe-III oxalate, Fe-III malonate, Fe-III tartrate, Fe-III citrate, Fe-II hydroxide and Fe-III hydroxide.

The azomalondialdehydes are obtained analogously to Example 10 by using the corresponding amines, instead of aniline, as the diazo component.

Examples of amines suitable for use as the diazo component are: p-chloroaniline, p-methoxyaniline, p-ethoxyaniline, p-methylaniline, p-ethylaniline, p-nitroaniline, p-acetylaminoaniline, p-fluoroaniline, p-bromoaniline, p-cyanoaniline, p-methylsulfonylaniline, 2,4-dimethoxyaniline or 2,4-dichloroaniline, 2-aminobenzthiazole, 2-aminothiazole, 2-aminotriazole-1,3,4, 2-amino-5-phenyl-triazole-1,3,4, 3-aminoindazole and 1-phenyl-5-aminopyrazole.

EXAMPLE 11

A mixture of 987 g of leuco-Malachite Green, 1,483 g of glacial acetic acid, 15 g of chloranil and 15 g of the compound of the formula (Fe complex 16)

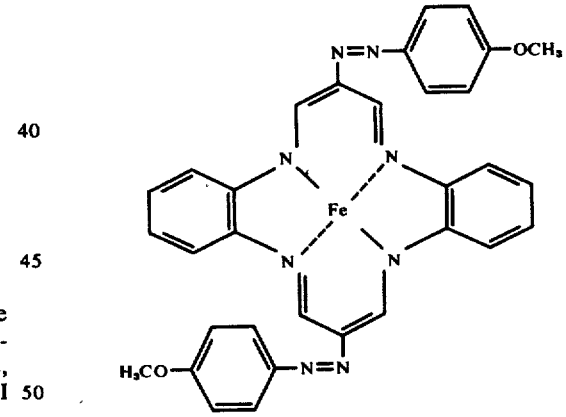

40

45 is gassed with air for 8–10 hours at 45°–50° C, whilst stirring vigorously.

After the oxidation, about 800 g of glacial acetic acid are distilled off under reduced pressure, the residue is dissolved in 10 l of water at 95° C and the solution is filtered hot. After adding 12 l of xylene to the filtrate, the dye base is liberated by means of 50% strength sodium hydroxide solution (pH = 10.5); the base dissolves in the xylene. The xylene phase is separated off and the dye chloride is precipitated therefrom by passing in 200 g of hydrogen chloride gas. After drying at 60° C, 1,123 g of Malachite Green chloride are obtained.

I claim:

1. In the process of catalytically oxidizing compounds of the formula

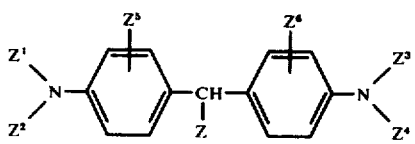

in which
Z¹ and Z³ each is hydrogen, alkyl of one to four carbon atoms, hydroxyalkyl of two or three carbon atoms, cyanoethyl, carboalkoxyalkyl of a total of 2 to 5 carbon atoms, methoxyethyl, ethoxyethyl, alkanoyloxyalkyl of a total of four to eleven carbon atoms, cyclohexyl, benzyl, phenylethyl, phenyl or phenyl substituted by methyl, methoxy or ethoxy or

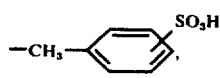

Z² and Z⁴ each is hydrogen, alkyl of one to four carbon atoms, hydroxyalkyl of two to three carbon atoms, cyanoethyl, methoxyethyl, ethoxyethyl or phenyl;

Z¹ and Z² or Z³ and Z⁴ when taken together with the accompanying nitrogen atom also form morpholine, piperidino, piperazino or pyrrolidino;

Z⁵ is hydrogen, chlorine, methyl, methoxy or ethoxy;
Z⁶ is hydrogen, chlorine, methyl, methoxy or ethoxy;
Z is hydrogen, phenyl or phenyl substituted by chlorine, methyl, hydroxy, methoxy, ethyl or hydrosulfonyl, 1-methyl-2-phenylindolyl-3, 2-methylindolyl-3, 2-phenylindolyl-3, 1-cyanoethyl-2-methylindolyl-3, 1-phenylpyrazolyl-4, 1,3-diphenylpyrazolyl, 1-phenyl-3-methylpyrazolyl-4, 1-phenyl-2,3-dimethylpyrazolinon-5-yl-4, 1,4-perimidinyl-4, perimidonyl-4 or

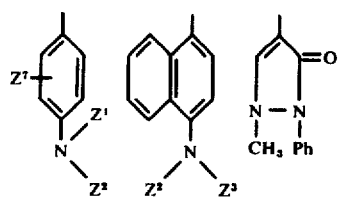

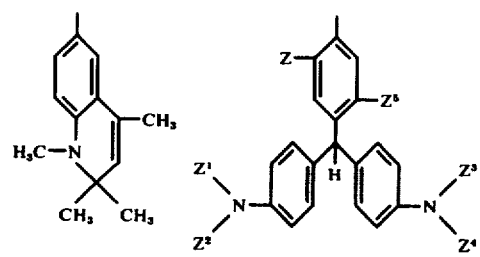

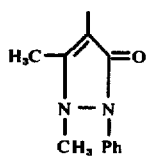

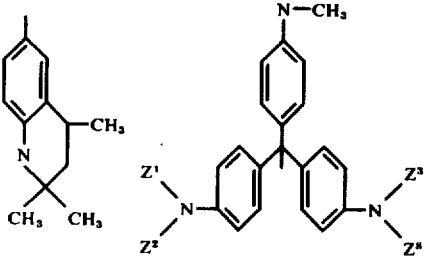

Z⁷ is hydrogen, chlorine, methyl, methoxy, ethoxy, acetylamino or carboxyl; and
Z⁸ is hydrogen or chlorine with a fluorine-, chlorine-, bromine- or nitrile-substituted benzoquinone or with a nitro-substituted phenanthrenequinone in the presence of oxygen and a catalyst which contains heavy metal bound as a complex and which activates oxygen, the improvement of said process which comprises using as the catalyst a compound of the formula

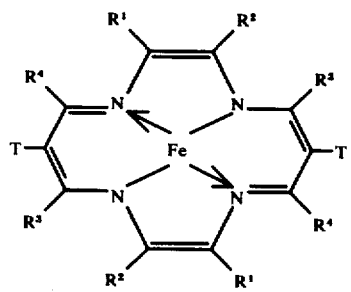

where R¹ to R⁴ independently of one another are hydrogen or methyl and R³ or R⁴ can also be phenyl, R¹ and R² together with the carbon atoms to which they are attached are

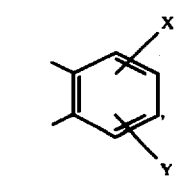

X is hydrogen, chloro, bromo, methyl, ethyl, phenyl, methoxy, ethoxy, nitro, cyano, methylsulfonyl or alkoxycarbonyl of 1 to 4 carbon atoms in the alkoxy,
Y is hydrogen, chloro or methyl and
X and Y together are —CH₂CH₂CH₂CH₂—, —CH=CH—CH=CH— or

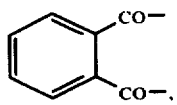

T is hydrogen or D—N=N— and

D is phenyl or phenyl substituted by methyl, ethyl, methoxy, ethoxy, acetylamino, chloro or bromo.

2. In the process according to claim 1 the use as catalyst of a compound of the formula

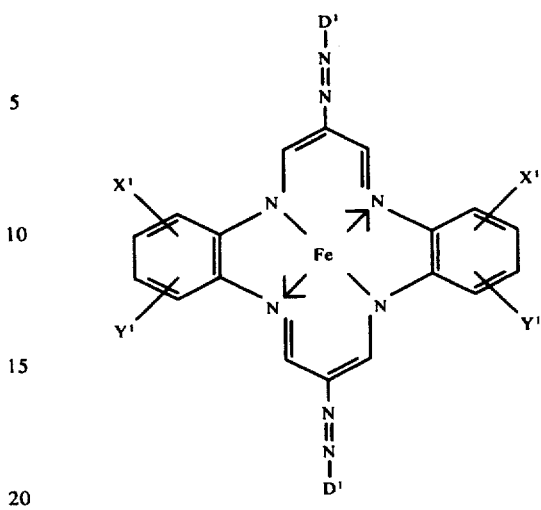

in which $X^1$ and $Y^1$ independently of one another are hydrogen, methyl, chlorine or bromine and $D^1$ is phenyl, o-tolyl, p-tolyl, o-anisyl, p-anisyl, p-ethoxyphenyl, p-chlorophenyl, o-chlorophenyl or 2,4-dichlorophenyl.

3. In a process according to claim 4, the use as catalyst of the compound of the formula

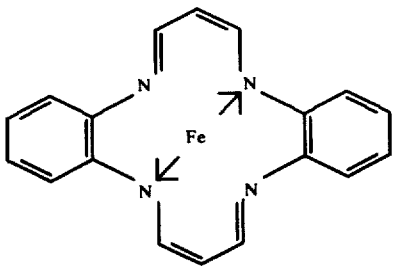

* * * * *